Feb. 24, 1942. C. P. NIELSEN 2,274,157
CARBON HOLDER FOR ELECTRIC ARC WELDING DEVICES
Filed Dec. 4, 1939
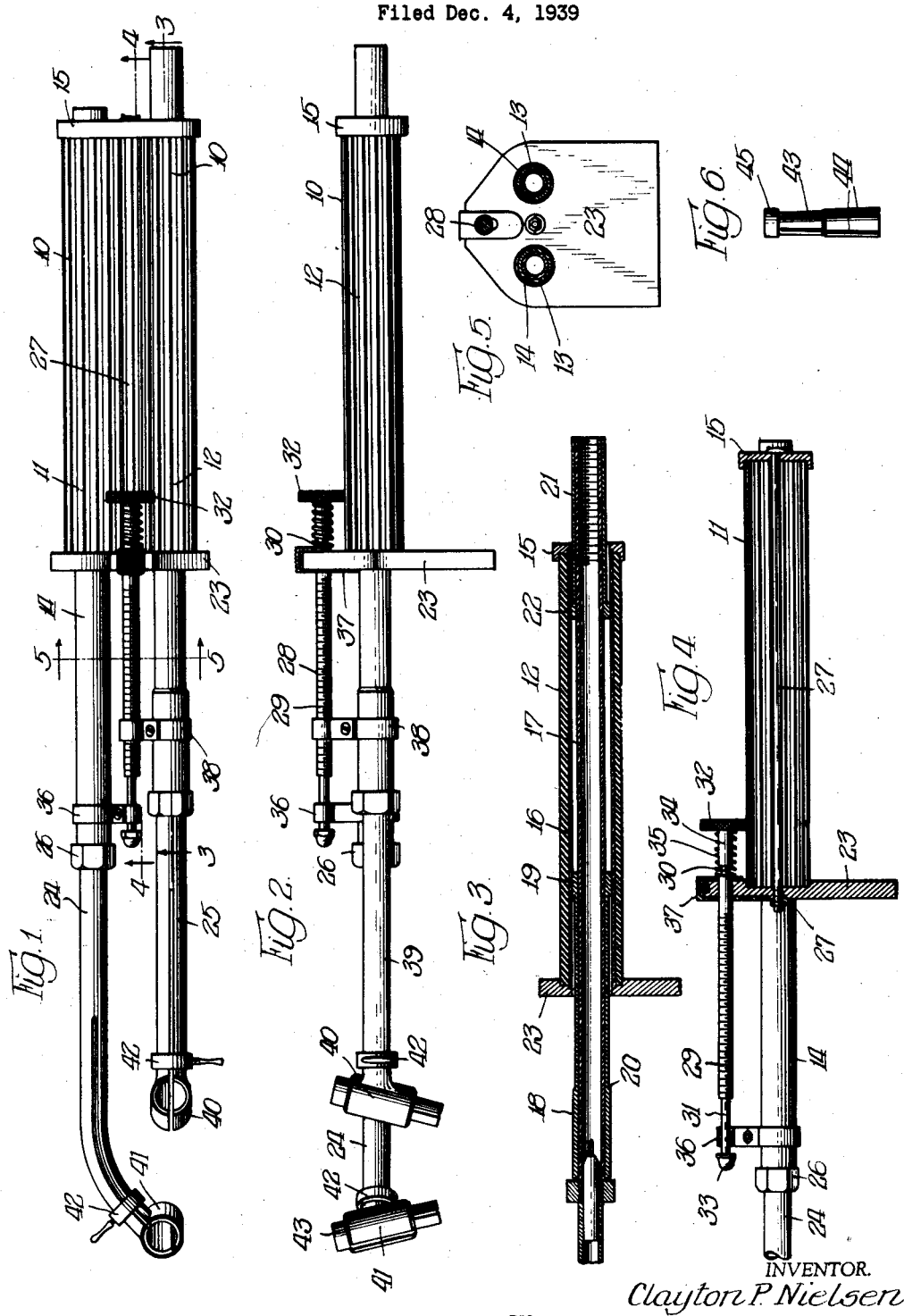
INVENTOR.
Clayton P. Nielsen,
BY
ATTORNEY.

Patented Feb. 24, 1942

2,274,157

UNITED STATES PATENT OFFICE 2,274,157

CARBON HOLDER FOR ELECTRIC ARC WELDING DEVICES

Clayton P. Nielsen, Chicago, Ill.

Application December 4, 1939, Serial No. 307,377

4 Claims. (Cl. 219—14)

Attention is directed to my co-pending applications, being design application, Serial No. D86,915, mechanical application, Serial No. 292,172, and my design application executed the same date herewith and filed herewith. This application is a continuation in part of Serial No. 292,172. All of these applications are co-pending.

This invention has to do with a holder for the electrodes of an electrical arc welding device. More particularly, it relates to the means by which the electrodes are held in position for the welding, the means of adjusting said holding means, and the means for manipulating the holding means to perform the most efficient and desirable arc welding operation.

It is an object to provide a device which uses an arc between two electrodes, preferably carbon, which arc may be controlled at least to some degree, providing a hot arc or one not so hot; the use of any gas causing a "blow" being eliminated; the position of the carbons being adjustable to compensate for deterioration of the electrodes to control the intensity of the flame of the arc.

Welding certain materials such as aluminum, aluminum alloys, copper, copper alloys, and other non-ferrous metals, has in the past been extremely difficult. As pointed out in my previous application Serial No. 292,172, satisfactory welding may be accomplished by means of an arc between two carbons.

It is an object of the present invention to provide a holder in which the position of one carbon is spaced from the position of the other carbon in a direction longitudinally of the carbon holder. This provides for the flame of the arc to be at all times clearly visible and not obstructed from view of the operator. In this connection it is a further object to provide a holder which may be manipulated by the use of a single hand, having handle means designed to be held in one hand of the operator and which handle means carry both (all) of the electrodes. It is a further object to provide an adjusting means whereby the electrodes may be spaced a desired distance apart, which distance is variable by the operator. In this connection it is an object to provide a device in which at least one of the electrodes is movable in a direction lengthwise of the holder.

It is a further object to provide a novel and efficient arrangement for "striking an arc" and an equally novel and efficient means for breaking the arc.

It is a further object to provide a thumb screw easily manipulated by the operator and which may be turned to move one of the electrodes with respect to the other so as to adjust it for the length of the arc, and which may be pressed by the thumb of the hand of the operator holding the carbon holder, which pressure moves one electrode into arc striking position with respect to the other electrode, and which will, upon removal of thumb pressure automatically bring said electrode back into arc maintaining position for the welding operation.

It is a further object to provide a means normally retaining said movable electrode in position with respect to the other electrode during the welding operation, but which means may be manipulated by pressure of a finger or thumb of the operator, releasing a means causing the movable electrode to move away from the other electrode a sufficient distance to break the arc. In this connection it is a further object to provide an arc breaking means which cooperates with and is a part of the electrode positioning means and the adjusting means.

One of the advantages of the present invention is the provision of holding means adapted to hold electrodes of a smaller size than the device is ordinarily intended to use, said holding means cooperating with the regular tip holders of the device, thus permitting a cheaper electrode to be used, and one which does not require so much power, and will do more accurate work within the limits of the capacity of the electrode.

It is an object to provide a yieldable pressure maintaining means for striking the arc and readjusting the electrode to the predetermined position, which means may be released by a simple manipulation of a catch and which release will break the arc under normal conditions.

It is a further object to provide a rigid handle for both electrodes which may be constructed comparatively inexpensively, which is easily manipulated by one hand of the operator, thus leaving the other hand free to handle the object being welded, and which holder is efficient and durable.

It is a further object to provide a rest for the holder which rest forms a guard for the hands and likewise forms a journal for at least a portion of the adjusting means, and at the same time carries the locking and releasing mechanism used in striking, maintaining and breaking the arc.

It is a further object to provide an electrode carrying means which is adjustable with respect to the handle, but which is so constructed as to provide an efficient current conducting medium—at the same time being efficiently insulated from the hand of the operator.

Lastly, it is an object to provide a device which is easily assembled and dis-assembled, easily packed for shipment, and the individual parts of which may be replaced if desired upon damage or the like, without special tools other than those ordinarily available to any user.

Other objects and advantages of the invention will appear as the nature of the improvements is better understood, the invention consisting substantially in the novel construction, combination and arrangement of parts hereinafter fully described, illustrated in the accompanying drawing, and finally pointed out in the appended claims.

In the drawing:

Figure 1 is a top plan view of the device forming the subject matter of this invention;

Figure 2 is a side elevation of the device of Figure 1, showing the tips with electrode holding inserts, forming the subject matter of Figure 6;

Figure 3 is a view taken on the line 3—3 of Figure 1, looking in the direction of the arrows;

Figure 4 is a view taken on the line 4—4 of Figure 1, looking in the direction of the arrows;

Figure 5 is a view taken on the line 5—5 of Figure 1, looking in the direction of the arrows; and Figure 6 is an elevation showing a carbon holding insert for use as indicated in Figure 2.

Referring more in detail to the constructions shown in the various figures, I have provided the handle 10, which is preferably rigid and not adapted for movement in any direction with respect to its component parts. As will be apparent from Figures 3, 4 and 5 the handle 10 is preferably composed of the insulated grips 11 and 12, comprising rubber or the like such as a rubber hose. As I have shown the construction, grip 11 surrounds a conducting member 13 (hereinafter called tube), and a fiber tube 14 which provides additional protection and insulation. As indicated, this assembly forming the grip 11, the tube 13, and the fiber tube 14, are tightly held in position and preferably are so constructed that they are not adapted to move with respect to each other. The base stop 15 fits around the fiber tube 14 and tube 13, and up against the end of the grip 11.

The grip 12 surrounds a fiber tube 16 through which extends the movable conducting member 17, hereinafter called movable tube. Surrounding the movable tube 17 is a fiber or the like element 18, which is provided with a surface which may be called a bearing surface 19 and a bearing stop or shoulder 20. At the other end, the movable tube 17 is preferably likewise provided with a fiber element 21 having a bearing portion 22. The fiber element 18, and the fibrous element 21, by means of the bearing portions 19 and 22, hold the movable tube 17 firmly within the fiber tube 16, and at the same time permit it to move longitudinally thereof. The limits of longitudinal movement in a direction toward the base stop 15 are usually determined by the bearing stop 20 reaching the support 23. This will be particularly apparent in Figures 1, 2 and 3.

It will be understood that the conducting tubular members herein provided are made tubular for lightness and cheapness. Solid material would work equally well except that some other means would have to be used for holding the tip rods 24 and 25 attached to the members 13 and 17.

Incidentally, the fibrous elements hereinabove mentioned may be any good insulating material, but are preferably a material with a hard finish making a good bearing surface and providing a long wearing finish with pleasing appearance. The fiber tube 14 extends either all the way through the grip 11 or merely a part way through, as desired, but preferably extends out to a position adjacent the retaining nut 26. The same is true of the fiber element 18. The conducting tubes are thus insulated from accidental contact by the operator. The support 23 and the base stop 15 are held tightly in position against the ends of the grips 11 and 12 by bolt or the like means such as the bolt 27. Preferably the grips 11 and 12 are countersunk slightly in the support 23 and base 15 such as is apparent, particularly in Figures 3 and 4. The grips will be firmly held in place against movement in any direction with respect to the other parts, and will form a light effective handle for the use of the operator.

The support 23 carries a thumb bolt or the like 28, which passes through a hole or slot within the support 23. This thumb bolt is especially constructed, and is preferably provided with threads 29, which are carried on an enlarged section, with a grooved portion 30, forming a portion of the bolt with a narrower diameter, a small end portion 31 on the end opposite the head 32, and a nut 33 screwed on to the end of the bolt 28.

The smooth shoulder 34 carries the spring 35.

The small end portion 31 is movably journaled in the clamp 36, which clamp 36 is securely held by screw or other means about the fiber tube 14 near the nut 26. This clamp 36 forms a permanent anchoring member for the bolt 28, but the bolt is slideable longitudinally as will be apparent from Figure 4, within the limits created by the nut 33 and the shoulder of the portion with the threads 29, on the small end portion 31. Fitting around said bolt 28 and preferably carried on the support 23, is a catch 37 which is preferably under spring pressure. This catch is adapted to cooperate with the groove 30 of the bolt 28, so that when the head 32 is pushed lengthwise toward the nut 33, the catch 37 will click into place when the groove 30 passes the left-hand side of the catch as viewed in Figure 4. The spring 34 will normally retain the bolt 28 in the position shown in Figure 4 unless the catch 37 is in the groove 30, in which case it will normally retain the bolt with the left-hand shoulder of the groove 30 up against the left-hand face of the catch 37, which is the normal welding position. When the bolt 28 is in the position shown in Figure 4 the arc has been broken.

When it is desired to strike an arc, the thumb or other portion of the hand of the operator presses against the head 32 of the bolt 28, and shoves it as far to the left (in the view shown in Figure 4) as it will go. The groove 30 permits the bolt 28 to move a short distance to the left even after the catch 37 has slipped into place for normal operating position.

The tube 17, as surrounded by the fiber element 18 is provided with a threaded clamp 38. This threaded clamp 38 fits tightly around and is securely held on the assembly of the tube 17 and the fiber element 18. This clamp 38 is provided with threads as will be apparent from examination of Figures 1 and 2, through which the threaded portion of the bolt 28 is screwed. Rotating the bolt 28 threads the clamp 38 onto or off of the threaded portion, thus moving it longitudinally of the bolt. Since the movable tube 17 is carried by the clamp 38, turning the bolt 28 by means of the head 32, or otherwise, moves the tube longitudinally in the direction the clamp moves on the threads. Since the movable tube 17 is provided with the tip rod 39 and the tip 40, which movable tip 40 carries an electrode (not shown) it is obvious that the electrode will be moved longitudinally by manipulation of the bolt 28. It is thus apparent that turning the bolt 28 adjusts the electrode in proper position, by moving the movable tip 40 with respect to the fixed tip 41, and consequently the electrodes with respect to each other.

To strike an arc, you first adjust the tips 40 and 41 with respect to each other by turning the bolt 28. Then press the head 32 moving the bolt in a lengthwise direction, as will be apparent from Figure 4. This brings the electrodes in close proximity, or together, and the arc will be struck. Release of pressure on the head 32 moves the tip 40 and its electrode back to the normal operating position which will be determined by the position of the clamp 38 and the left-hand shoulder of the groove 30 as it fits against the left-hand face of the catch 37. In case the arc should go out accidentally, pressing the head 32 as before will again strike the arc. In case it is desired to break the arc, pressure downward on the catch 37 will cause the spring 35 to move the bolt 28 back to the position shown in Figure 4. This separates the electrodes.

The tips 40 and 41 are preferably slotted, in the manner set forth in my previous application above mentioned. The set screws 42 are tightened as shown in the above application to grip the electrodes. Normally an electrode of one-half inch or more is preferable for heavy duty work. In event it is desired to use a lighter electrode, for very light work where a smaller arc is needed, or where greater control is needed, it is necessary to have some means of retaining these electrodes in position in the tips 40 and 41. For this purpose I have provided the tip insert 43, which is clearly shown in Figure 6, and shown in position in Figure 2. If for example one-quarter inch electrode is to be used, a tip insert of the proper size is set in position in the tips 40 and 41, and the tightening of the clamps or set screws 42 will cause the electrode to be securely held in position. The tip insert 43 is slotted, as shown by the slots 44, and is provided with the ferrule 45. This ferrule 45 provides a shoulder or stop pushing the inserts in the tips 40 and 41. It will be seen that tightening the tips 40 and 41 by means of the set screws 42 takes up the slack provided by the slots 44, and grips the electrode firmly. The tip insert 43 is preferably of a conducting material, or if not is provided with contacts between the tips and the electrodes.

The support 23, as clearly shown in Figure 5, provides a handy rest for the carbon holder, so that it may be put down or picked up without difficulty and so that when set down the electrodes will not contact the surface on which they are resting. The weight of the whole handle and the contacts, and the lead-in connections, will ordinarily be sufficient to hold the tips up in the air using the support 23 as a fulcrum. It also protects the hands of the operator from the heat of the arc.

It will thus be seen that I have provided a simple and efficient arc welding device adaptable to use by one hand of the operator, and to rapid adjustment in manipulation, as well as to the use of the variable size of electrode.

The form of the invention herein shown and described presents a preferred embodiment thereof, and delineates its adaption to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. In a device of the class described an electrode holding tip on a tip rod, said tip rod attaching to a conducting tubular member which in turn is carried by a handle, a second electrode holding tip on a tip rod, said tip rod in turn being carried by a movable conducting member, which in turn is movably journaled with respect to the handle abovementioned, and is adjustable for positioning the movable tip with respect to the first mentioned tip, said adjusting means comprising a thumb bolt carried by a support on said handle, said thumb bolt having a small end portion on its extremity opposite the head portion, which small end portion is slideably journaled in a clamp which in turn is attached to the conducting tubular member abovementioned, and which small end portion is prevented from sliding out of the clamp by means of a nut, and the threads on said thumb bolt, threaded clamp means secured to said movable conducting member carried on the threads of said thumb bolt, whereby rotating the thumb bolt moves the movable conducting member with respect to the fixed electrode carrying tip, a groove on said thumb bolt adapted to receive a catch means and cooperate with said catch means holding the thumb bolt against movement of the movable tip away from the fixed tip of the conducting tubular member, said groove being proportioned so that pressure on the head of the thumb bolt will move the movable tip toward the fixed tip thus striking an arc, spring means normally retaining the thumb bolt under pressure to move in a direction causing the movable tip to move away from the fixed tip when the catch is released, and means retaining the catch in the groove holding the thumb bolt in normal operating position and thus the movable tip in predetermined position with respect to the fixed tip, said catch being adapted to release the thumb bolt when pressed by an operator.

2. In a device of the class described an electrode holding tip on a tip rod, said tip rod attaching to a conducting tubular member which in turn is carried by a handle, a second electrode holding tip on a tip rod, said tip rod in turn being carried by a movable conducting member, which in turn is movably journaled with respect to the handle abovementioned to move longitudinally through the handle, and is adjustable for positioning the movable tip with respect to the first mentioned tip, said adjusting means comprising a thumb bolt carried by a support on said handle, said thumb bolt having a small end portion on its extremity opposite the head portion, which small end portion is slideably journaled in a clamp which in turn is attached to the conducting tubular member abovementioned, and which small end portion is prevented from sliding out of the clamp by means of a nut, and the threads on said thumb bolt, threaded clamp means secured to said movable conducting member carried on the threads of said thumb bolt, whereby rotating the thumb bolt moves the movable conducting member with respect to the fixed electrode carrying tip, a groove on said thumb bolt adapted to receive a catch means and cooperate with said catch means holding the thumb bolt against movement of the movable tip away from the fixed tip of the conducting tubular member, said groove being proportioned so that pressure on the head of the thumb bolt will move the movable tip toward the fixed tip thus striking an arc, spring means normally retaining the thumb bolt under pressure to move in a direction causing the movable tip to move lengthwise away from the fixed tip when the catch is released, and means retaining the catch in the groove holding the thumb bolt in normal operating position and thus the movable tip in predetermined position with respect to the fixed tip, said catch being adapted to release the thumb bolt when pressed by an operator.

3. In a device of the class described an electrode holding means comprising two tips or the like respectively carried by conducting means such as a conducting tubular member and a longitudinally movable conducting member and means operable to hold the electrodes in predetermined position with respect to each other for normal welding operation using an arc, said means comprising a thumb bolt or the like having a portion such as a groove, and likewise comprising an automatic catch, which cooperates with said thumb bolt portion such as the groove normally retaining the thumb bolt against movement with respect to the catch and thus maintaining the electrodes carried by the electrode holding means in normal operating position, and means on the thumb bolt or the like, such as a spring, operable to move the above-mentioned electrodes apart breaking the arc upon release of the catch means abovementioned.

4. In a device of the class described, electrode holding means comprising in combination a plurality of conducting members carried by a handle means, electrode retaining means on each of said conducting members, and one of said electrode retaining means being curved in shape whereby its electrode is positioned substantially longitudinally with respect to the other electrode retaining means, means operating one electrode retaining means to move it longitudinally, said means comprising a thumb bolt movably carrying threaded means, such as a threaded clamp, attaching to one of said conducting members whereby rotation of the thumb bolt moves said conducting member and the electrode holding member carried thereby, longitudinally with respect to the other electrode holding member, spring means exerting tension on one of said conducting means longitudinally away from the other electrode retaining means, a catch in connection with said thumb bolt normally retaining said movable conducting means against movement from the other electrode retaining means under pressure of the spring means abovementioned, said catch being releasable under thumb pressure by an operator whereby said spring means moves said movable conducting means longitudinally away from the other electrode retaining means, thus breaking the arc between any two electrodes held by said electrode retaining means, and means whereby said thumb bolt is movable longitudinally in opposite direction to the force of the spring means without disturbing the catch, resulting in striking the arc by bringing said electrode retaining means close together, said arrangement being such that the spring means returns the thumb bolt against the catch to normal operating position after striking the arc.

CLAYTON P. NIELSEN.